US012073288B2

(12) United States Patent
Sandberg et al.

(10) Patent No.: US 12,073,288 B2
(45) Date of Patent: Aug. 27, 2024

(54) COMPACT RESONATOR WITH SHIFTED HIGHER MODES FOR QUANTUM BUSES

(71) Applicant: INTERNATIONAL BUSINESS MACHINES CORPORATION, Armonk, NY (US)

(72) Inventors: Martin O. Sandberg, Ossining, NY (US); Vivekananda P. Adiga, Ossining, NY (US); Hanhee Paik, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 825 days.

(21) Appl. No.: 16/802,503

(22) Filed: Feb. 26, 2020

(65) Prior Publication Data

US 2021/0264308 A1 Aug. 26, 2021

(51) Int. Cl.
*G06N 10/00* (2022.01)
*H01P 7/08* (2006.01)

(52) U.S. Cl.
CPC ............. *G06N 10/00* (2019.01); *H01P 7/086* (2013.01)

(58) Field of Classification Search
CPC ......... G06N 10/00; G06N 10/40; H01P 7/086
See application file for complete search history.

(56) References Cited

U.S. PATENT DOCUMENTS 9,841,484 B2 12/2017 Mohebbi et al.
9,893,262 B2 2/2018 Thompson et al.
10,013,657 B2 7/2018 Bourassa et al.
10,134,972 B2 11/2018 Oliver et al.
2014/0264287 A1* 9/2014 Abraham ................ H01P 7/086 257/31
2016/0104073 A1 4/2016 Sandberg et al.
2019/0102691 A1* 4/2019 Chow ...................... H03K 3/38

FOREIGN PATENT DOCUMENTS

WO 2017/007446 A1 1/2017
WO 2018/182584 A1 10/2018

OTHER PUBLICATIONS

Chow, J. et al., "Implementing a Strand of a Scalable Fault-Tolerant Quantum Computing Fabric"; Nature Communications (2014); vol. 5:1; 9 pgs.
Hutchings, M. et al., "Tunable Superconducting Qubits with Flux-Independent Coherence"; arXiv:1702.02253v2 (2017); 18 pgs.
International Search Report from related application No. PCT/EP2021/053766 dated May 20, 2021; 19 pgs.
Goppl, M. et al., "Coplanar Waveguide Resonators for Circuit Quantum Electrodynamics" I Journal of Applied Physics (2008); vol. 104; pp. 113904-1-113904-8.
Jin, Y. et al., "High-Quality Stepped-Impedance Resonators Suitable for Circuit-QED Measurement of Superconducting Artificial Atoms"; IEEE Transactions on Applied Superconductivity (2017); vol. 27:4; 4 pgs.

* cited by examiner

*Primary Examiner* — Ermias T Woldegeorgis
(74) *Attorney, Agent, or Firm* — Intelletek Law Group, PLLC; Gabriel Daniel, Esq.

(57) ABSTRACT

A resonator is based on a coplanar waveguide (CPW) structure that includes a first end portion having a first width and configured to be coupled to a first qubit. There is a middle portion having a second width that is narrower than the first width. There is a second end portion having a third width that is wider than the second width and configured to be coupled to a second qubit.

22 Claims, 7 Drawing Sheets

COMPACT RESONATOR WITH SHIFTED HIGHER MODES FOR QUANTUM BUSES

BACKGROUND

Technical Field

The present disclosure generally relates to superconducting devices, and more particularly, coupling qubits together.

Description of the Related Art

Superconducting quantum computing is an implementation of a quantum computer using superconducting electronic circuits. Quantum computation utilizes quantum phenomena for information processing and communication. Various models of quantum computation and quantum simulation exist. The fundamental building block of a gate based quantum computer is the quantum bit (qubit). A qubit is a generalization of a bit that has two possible states, but due to its quantum nature it can be in a superposition of both states. A quantum gate is a generalization of a logic gate, however the quantum gate describes the transformation that one or more qubits will experience after the gate is applied on them, given their initial state.

There are many different implementations of quantum bits using superconducting circuits. A common element is typically the Josephson junction. A Josephson junction is a weak link between two superconducting electrodes that allows for dissipationless tunneling of Cooper pairs between the electrodes. Due to the relationship between the voltage and the tunneling current across the junction the Josephson junction can in some instances be viewed like a non-linear lossless inductor. One of the most successful implementations of a quantum bit is the so-called transmon qubit. A transmon qubit comprises a Josephson junction in parallel with a shunt capacitor, hence forming an anharmonic oscillator. The two states of the quantum bit is then taken as two lowest energy levels (called ground stated and first excited state) of the anharmonic oscillator. The energy difference between the two states corresponds to a frequency in the few GHz regime (often around 5 GHz). To read out the qubit state, a microwave signal is applied to the microwave readout cavity that is coupled (for instance through a coupling capacitance) to the qubit. The transmitted (or reflected) microwave signal goes through multiple thermal isolation stages and low-noise amplifiers that are used to block or reduce the noise and improve the signal-to-noise ratio. From the amplitude and/or phase of the returned/output microwave signal information about the qubit state can be inferred. The microwave signal carrying the quantum information about the qubit state is usually weak (e.g., on the order of a few microwave photons). To measure this weak signal, low-noise quantum-limited amplifiers (QLAs), such as Josephson amplifiers and travelling-wave parametric amplifiers (TWPAs), may be used as preamplifiers (i.e., first amplification stage) at the output of the quantum system to boost the quantum signal, while adding the minimum amount of noise as dictated by quantum mechanics, in order to improve the signal to noise ratio of the output chain. In addition to Josephson amplifiers, certain Josephson microwave components that use Josephson amplifiers or Josephson mixers such as Josephson circulators, Josephson isolators, and Josephson mixers can be used in scalable quantum processors.

The ability to include more qubits is salient to being able to realize the potential of quantum computers. Applicants have recognized that, to increase the computational power and reliability of a quantum computer, improvements can be made in two main dimensions. First, is the qubit count itself. The more qubits in a quantum processor, the more states can in principle be manipulated and stored. Second is low error rates, which is relevant to manipulate qubit states accurately and perform sequential operations that provide consistent results and not merely unreliable data. Thus, to improve fault tolerance of a quantum computer, a large number of physical qubits should be used to store a logical quantum bit. In this way, the local information is delocalized such that the quantum computer is less susceptible to local errors and the performance of measurements in the qubits' eigenbasis, similar to parity checks of classical computers, thereby advancing to a more fault tolerant quantum bit.

SUMMARY

According to one embodiment, a resonator includes a coplanar waveguide (CPW) structure that includes a first end portion having a first width and configured to be coupled to a first qubit. There is a middle portion having a second width that is narrower than the first width. There is a second end portion having a third width that is wider than the second width and configured to be coupled to a second qubit.

In one embodiment, the first width is substantially equal to the third width.

In one embodiment, the middle portion of the CPW structure is folded.

In one embodiment, at least one of the first or second end portions has an S structure. The S structure may be around one or more bonding structures. At least one of the one or more bonding structures can be an under-bump metal (UBM).

In one embodiment, the first and third widths are based on a width that provides a capacitance and inductance of the first and second end portions, respectively, that increases a frequency of modes that are above a fundamental frequency of the CPW structure.

In one embodiment, the coupling between the first qubit and the first end portion is capacitive.

In one embodiment, a length of the first end portion and a length of the second end portion are each shorter than a length of the middle portion.

In one embodiment, an inductance of the middle portion is higher than an inductance of each of the first and second end portions. A capacitance of the middle portion may be lower than a capacitance of each of the first and second end portions.

In one embodiment, a first mode of the resonator is above a factor of 2 times a fundamental frequency of the resonator.

According to one embodiment, a quantum bus system, includes a first qubit and a second qubit. There is a CPW structure that includes a first end portion having a first width and coupled to the first qubit; a middle portion having a second width that is narrower than the first width; and a second end portion having a third width that is wider than the second width and coupled to the second qubit.

In one embodiment, the middle portion of the CPW structure is folded and at least of the first or second end portions has an S structure. The S structure may be around one or more bonding structures.

In one embodiment, the first and third widths are based on a width that provides a capacitance and inductance of the first and second end portions, respectively, that increases a frequency of modes that are above a fundamental frequency of the CPW structure.

In one embodiment, the coupling between the first qubit and the first end portion is capacitive.

In one embodiment, a length of the first end portion and a length of the second end portion are each shorter than a length of the middle portion.

In one embodiment, an inductance of the middle portion is higher than an inductance of each of the first and second end portions, and a capacitance of the middle portion is lower than a capacitance of each of the first and second end portions.

In one embodiment, a first mode of the resonator is above a factor of 2 times a fundamental frequency of the resonator.

According to one embodiment, a method of coupling qubits includes coupling a first end portion of a CPW structure to a first qubit. A second end portion of the CPW structure is coupled to a second qubit. A middle portion of the CPW structure is provided to have a width that is less than a width of the first end portion and a width of the second end portion.

In one embodiment, a frequency of modes that are above a fundamental frequency of the CPW structure is increased by adjusting a geometry of the first and second end portions of the CPW structure.

In one embodiment, the coupling between the first qubit and the first end portion is capacitive.

In one embodiment, a first mode of the CPW structure is configured to be a factor of at least 2 times a fundamental frequency of the resonator.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to superconducting devices, and more particularly, to efficient readout of quantum bits that are interconnected in a quantum processor. The connection between the quantum bits, sometimes referred to herein as qubits, are typically mediated by a bus resonator. What is provided herein is a resonator that has relatively low loss and mitigates the effects of unwanted extra modes, thereby improving the quality of a qubit readout. Further, the footprint of the bus resonator is relatively small, such that the total area of the entire quantum processor is reduced. By virtue of such minimization in size, the quantum processor can be operated at higher frequencies.

Example Architecture

Figure 1A:
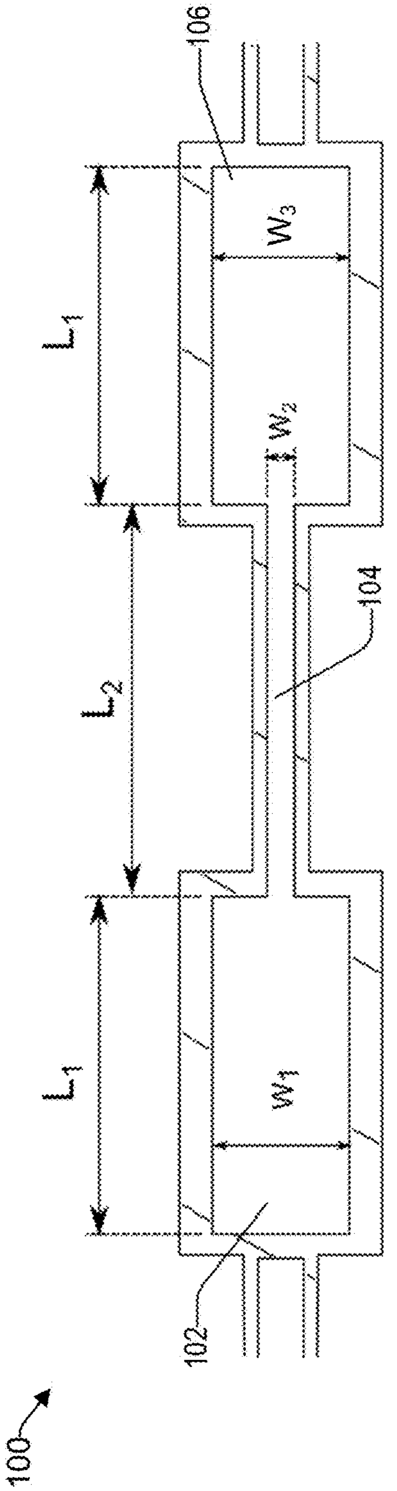
FIG. 1A illustrates an example architecture of a coplanar waveguide transmission line resonator, consistent with an illustrative embodiment.
Figure 1B:
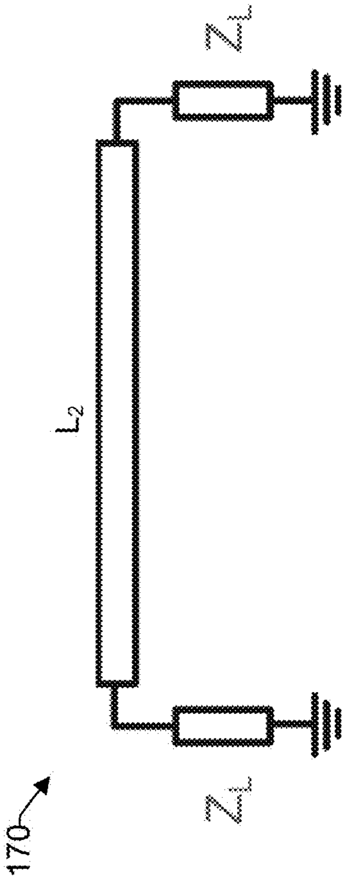
FIG. 1B provides a symbolic representation of a coplanar waveguide transmission line coupled between two load impedances.

FIG. 1A illustrates an example architecture 100 of a coplanar waveguide (CPW) transmission line resonator, consistent with an illustrative embodiment. FIG. 1B provides a symbolic representation of a CPW transmission line coupled between two load impedances ZL, respectively. The load impedances ZL represent the combined load of the coupling capacitor and the wide section (L1) of the transmission line. The resonator 100 can be used to connect qubits together. The connection is necessary for generating entanglement between the qubits. For example, there may be a grid of qubits that are connected together by way of the CPW transmission line resonator between each pair of qubits. The resonator 100 allows these qubits to interact with each other by providing the necessary coupling for qubit entanglement.

The architecture 100 represents a coplanar waveguide structure that includes middle portion 104, sometimes referred to herein as the main portion, between a first end portion 102 and a second end portion 106. The first end portion 102 may be coupled (e.g., capacitively or inductively) to a first qubit, whereas the second end portion 106 may be coupled (e.g., capacitively or inductively) to a second qubit. As illustrated, the main portion 104 has an appropriate length $L_2$, whereas the first and second end portions 102 and 106 can each have a different length. In one embodiment, the first end portion 102 and the second end portion 106 have a similar length $L_1$. In one embodiment, the ratio of the Length $L_2$ to $L_1$ is at least 0.2. The width $W_1$ of the first end portion 102 and the width $W_3$ of the second end portion 106 are each wider than the width $W_2$ of the middle portion 104. In one embodiment, the widths of the first end 102 and the second end are equal (i.e., $W_1=W_3$).

In one embodiment, the actual dimensions of the middle portion and the end portions are based on the middle portion 104 having an inductance that is a predetermined factor (e.g., 2) more than the end portions 102, 106. Additionally, the dimensions of the middle portion and the end portions are further based on the middle portion having a capacitance that is a predetermined factor (e.g., 2) less than the end portions 102, 106. Accordingly, the inductance and capacitance of the resonator are different at different portions of the resonator. The resonator 100 carries a standing microwave mode. The effective (i.e., lumped) circuit parameters of the resonator 100 are obtained by integrating the wave profile times the inductance L or capacitance C per unit length. By optimizing the inductance and the capacitance per unit length along the extent of the transmission line 170, a bus resonator that exhibits less interference with higher modes is obtained. The following equations can be used to obtain an expression for the resonance conditions:

$$Z_L = \frac{Z_1}{i\tan(\beta_1\ell_1)} \quad \text{(Eq. 1)}$$

Where, $$\beta_{1,2} = \omega\sqrt{L_{1,2}C_{1,2}} \quad \text{(Eq. 2)}$$

$$Z_{1,2} = \sqrt{\frac{L_{1,2}}{C_{1,2}}} \quad \text{(Eq. 3)}$$

The resonance condition for the fundamental mode can be written as:

$$Z_2\tan(\beta_2\ell_2/2) = \frac{Z_1}{\tan(\beta_1\ell_2)} \quad \text{(Eq. 4)}$$

The resonance condition for the first harmonic can be written as:

$$Z_2\tan(\beta_1 l_1) = Z_1\tan(\beta_2 l_2/2) \quad \text{(Eq. 5)}$$

In the foregoing equations we have used the fact that the imaginary part of the impedance as seen from the center of a resonator structure is zero for the fundamental mode, where as for the first excited mode, the imaginary part of the admittance is zero. The solutions for Eq. 4 and Eq. 5 can easily be found numerically.

To better appreciate the features of the novel resonator 100, it may be helpful to discuss a general operation of resonators. The resonant frequencies of resonators, referred to herein as normal modes or simply modes, are typically equally spaced multiples (harmonics) of a lowest frequency called the fundamental frequency. For example, for a typical λ/2 resonator, there are multiple modes on that transmission line implementing the resonator, including the fundamental frequency mode, and additional frequencies based on multiples of two from that fundamental frequency. Unlike traditional resonators, where the modes are simple multiples of the fundamental frequency, by virtue of using the "paddle" structure of the resonator 100, the higher modes are shifted further out (e.g., by a factor of 2.3 or more), thereby substantially reducing the effect of the higher mode on the qubit coupling. For example, for a half wave resonator, the second mode is pushed further higher in frequency than 2× the fundamental frequency. By virtue of moving the higher modes further away (i.e., higher) in frequency from the fundamental frequency, unwanted Purcell loss seen by the qubits smaller, as well as reducing spurious couplings between the qubits that are mediated by the higher resonance frequency.

Figure 2:
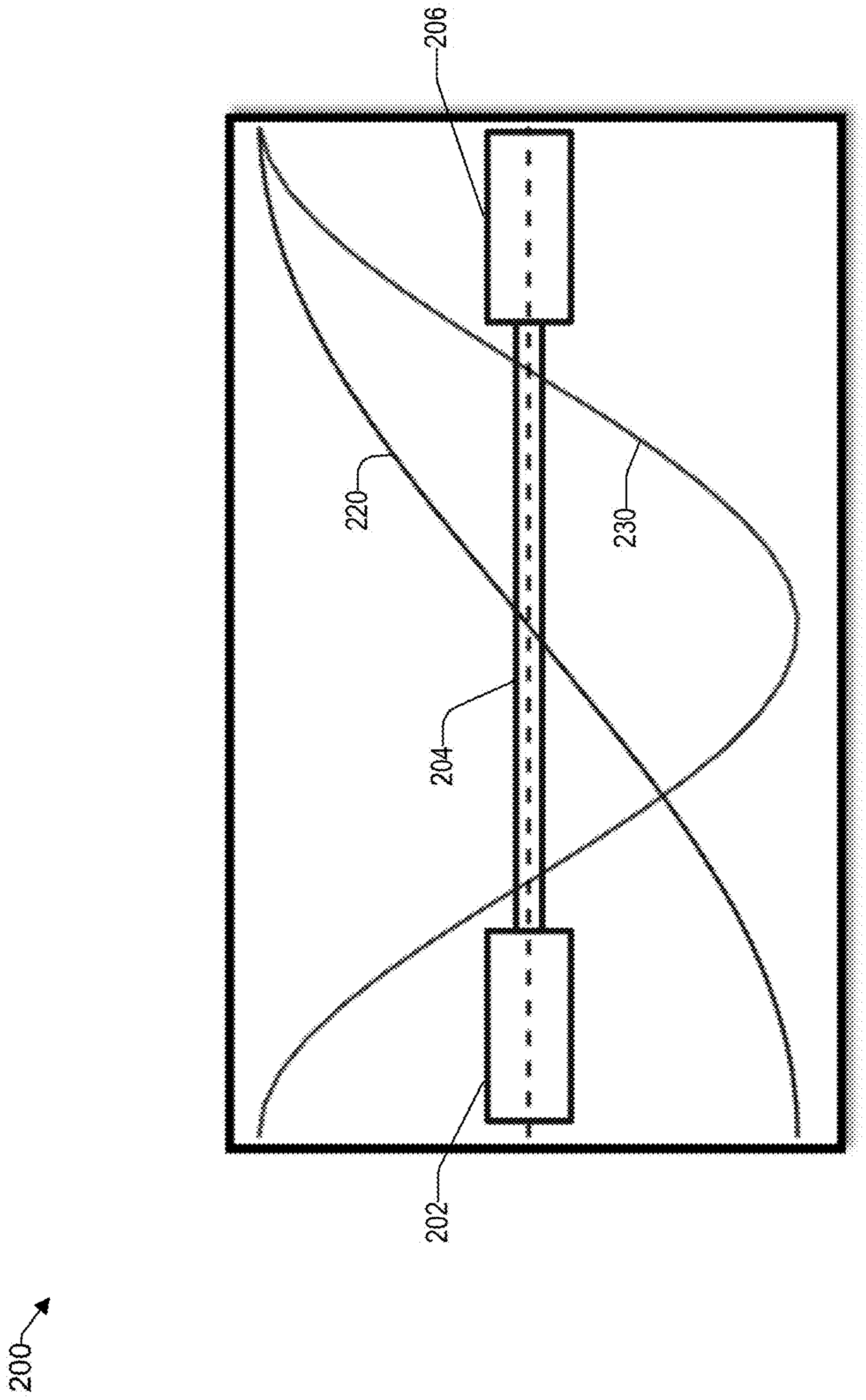
FIG. 2 illustrates an example resonator carrying a half wavelength and a full wavelength.

Reference now is made to FIG. 2, which illustrates an example resonator carrying a half wavelength 220 and a full wavelength 230. The standing wave on the resonator acting as a transmission line is only multiples of half a wavelength. As illustrated in FIG. 2, the width of the resonator is less in the middle portion 204 than the end portions 202 and 206, thereby creating a "paddle" configuration for the resonator. In this way, the velocity of the traveling wave traveling across the transmission line changes. The change in boundary conditions depends on what the standing wave looks like, affecting the fundamental mode from the second excited mode.

Figure 3A:
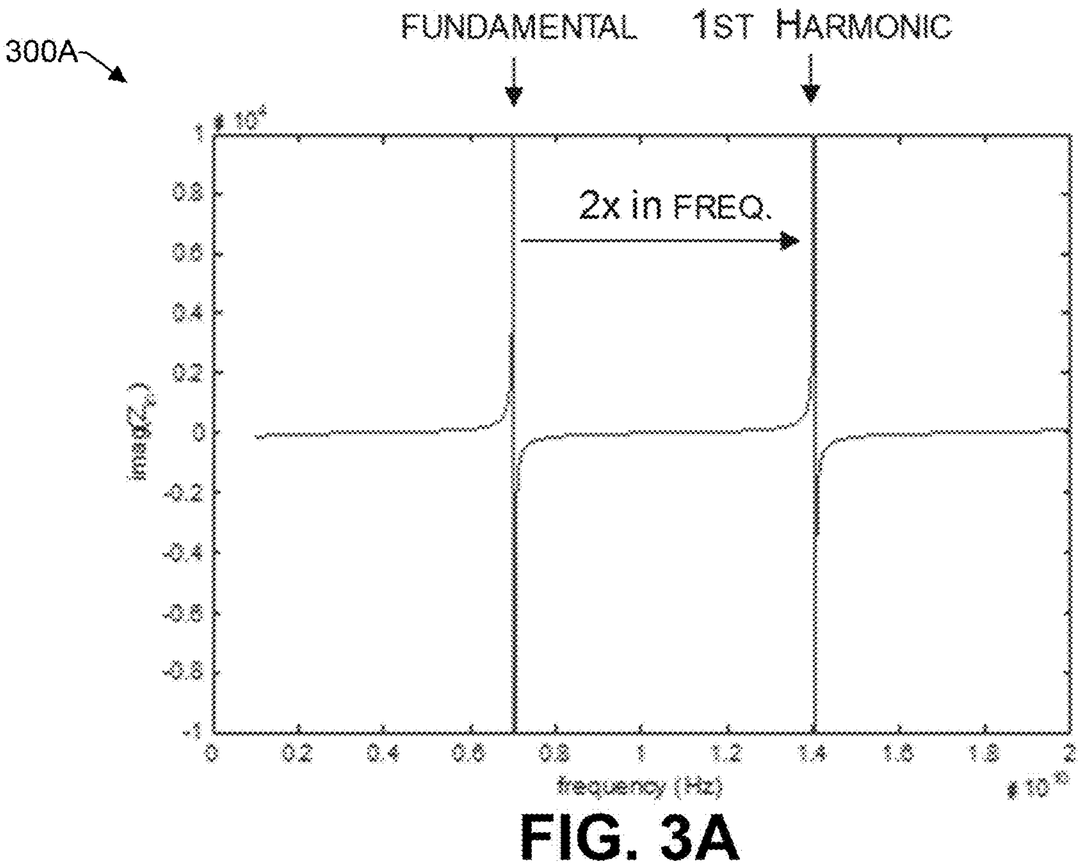
FIG. 3A illustrates a resonance of a traditional coplanar waveguide transmission line resonator.
Figure 3B:
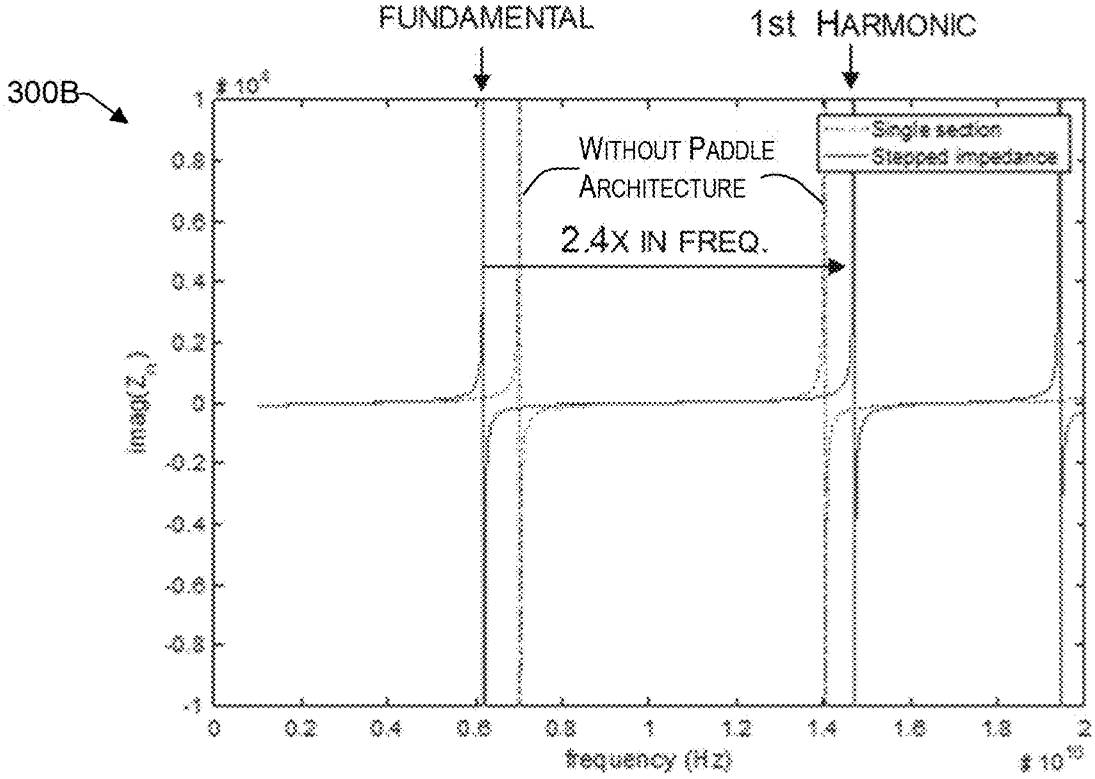
FIG. 3B illustrates a resonance of a coplanar waveguide transmission line resonator using a paddle structure, consistent with an illustrative embodiment.

FIGS. 3A and 3B illustrate a resonance of a traditional CPW transmission line resonator 300A and a resonance of a CPW transmission line resonator 300B using a paddle structure, respectively. For discussion purposes, the chart 300A is based on a capacitance of 165e-12F/m and an inductance of 2*pi*1e-7 H/m. The chart 300A illustrates the fundamental frequency (e.g., fundamental mode) to be at about 7 GHz and the first harmonic to be 2X in frequency, namely 1.5 GHz. By way of contrast, FIG. 3B illustrates a chart based on a resonator having a paddle structure, wherein the first end and the second end the resonator each have a higher capacitance but lower inductance than the middle portion. For discussion purposes and not by way of limitation, $C_1$=165e-12/m, $L_1$=2*pi*1e-7/m, $C_2$=105e-12/m and $L_2$=4*pi*1e-7/m. The chart demonstrates that there is a significant increase in separation between the fundamental frequency and the first harmonic (i.e., 2.4× in frequency in the example of FIG. 3B). It should be noted that, while the fundamental frequency is illustrated to shift to a lower frequency, the fundamental frequency can be set (i.e., controlled) by appropriate selection of the capacitance and inductance of each of the portions of the resonator. For example, the fundamental frequency can be maintained at 7 GHz, reduced to below 7 GHz, or even increased, based on design choice.

The salient feature of the present architecture is that the higher modes are shifted to frequencies that are above the 2× factor (2.4 in the present example of FIG. 3B). The further away in frequency the modes are, the lower the stray coupling between the fundamental frequency and the corresponding harmonic, thereby providing a substantially better-quality readout of a subject qubit.

Figure 4A:
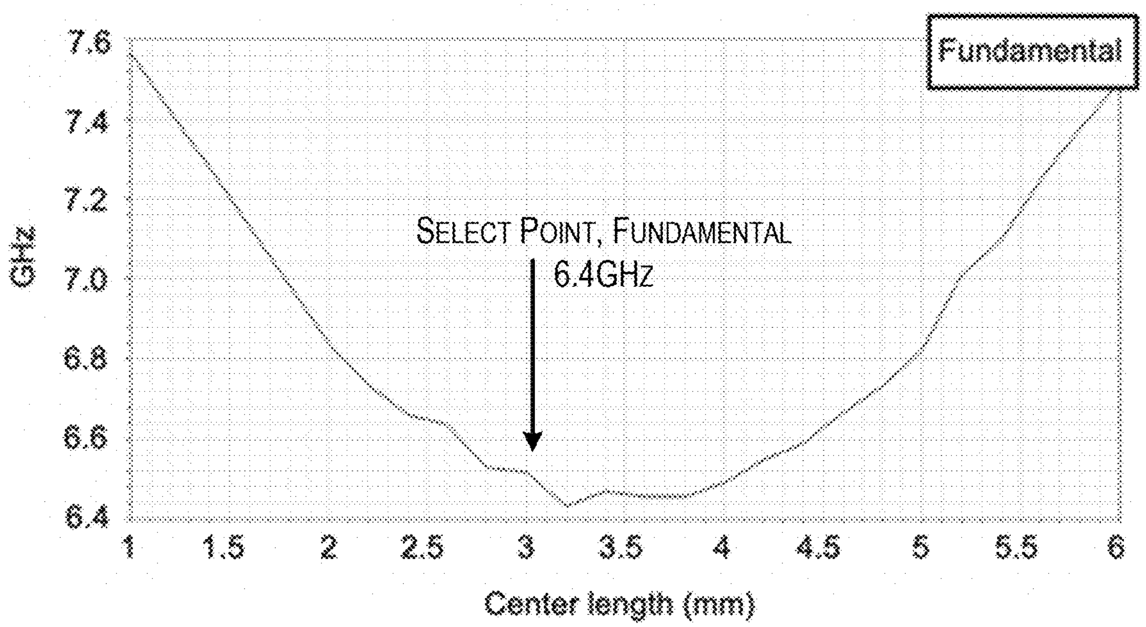
FIG. 4A illustrates a graph of a selected fundamental frequency of a resonator.
Figure 4B:
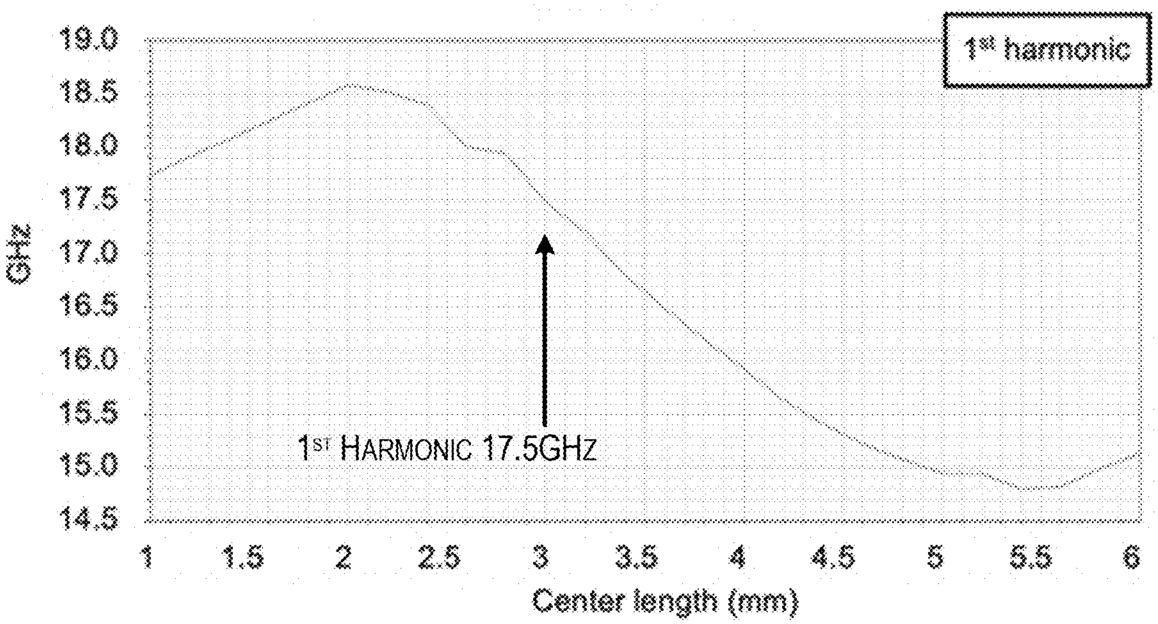
FIG. 4B illustrates a graph of a first harmonic of the resonator of FIG. 4A.

FIGS. 4A to 4B illustrate an example transmission line that is used in a simulator to select its fundamental frequency and first harmonic, respectively. In the example of FIGS. 4A to 4B, the total length of the resonator, including the wide and narrow parts is 7 mm. FIG. 4A illustrates a selected fundamental frequency of 6.4 GHz. In contrast to traditional resonators, where the first harmonic would be at 12.8 GHz, the high frequency finite element simulation software (HFSS) indicates that by using the paddle structure discussed herein, the first harmonic is significantly shifted out to 17.5 GHz, thereby providing an additional nearly 5 GHz of separation from the fundamental frequency.

Figure 5:
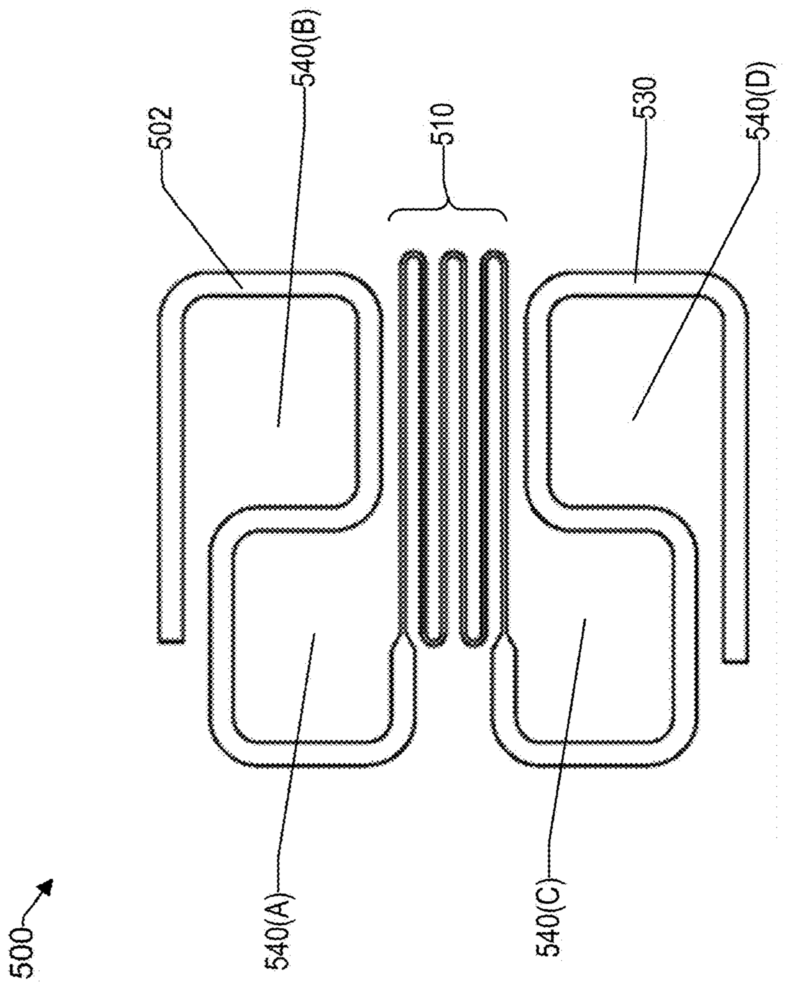
FIG. 5 illustrates an example resonator structure having a middle portion and two end portions that have a width that is wider than that of the middle portion, consistent with an illustrative embodiment.

Reference now is made to FIG. 5, which illustrates an example resonator structure having a middle portion 510 and two end portions 502 and 530 that have a width that is wider than that of the middle portion 510, consistent with an illustrative embodiment. In the example of FIG. 5, the resonator 500 is folded into a compact design. More particularly, the middle portion 510 is folded, such as having a serpentine structure, thereby saving real estate. In one embodiment, the structure of the narrow part of the center strip is chosen to be scientifically less than 10 μm (for instance 2 μm) and the wide part of the center strip is chosen to be significantly wider than 10 μm (for instance 30 μm). The narrow section of the resonator is close to half the total length leaving the wider end sections close to one quarter of the length each. The width of the narrow section is taken to be in a range that can be reliably produced using optical lithography. Using other fabrication techniques like electron beam lithography, even narrower center lines (sub μm) could be used. By leaving open areas at the ends, better mode suppression of slot line modes is provided, with fewer grounding points. In one embodiment, the folded middle section, representing the inductive section, can be meandered tightly to a pitch of 60 μm to minimize footprint.

Figure 6:
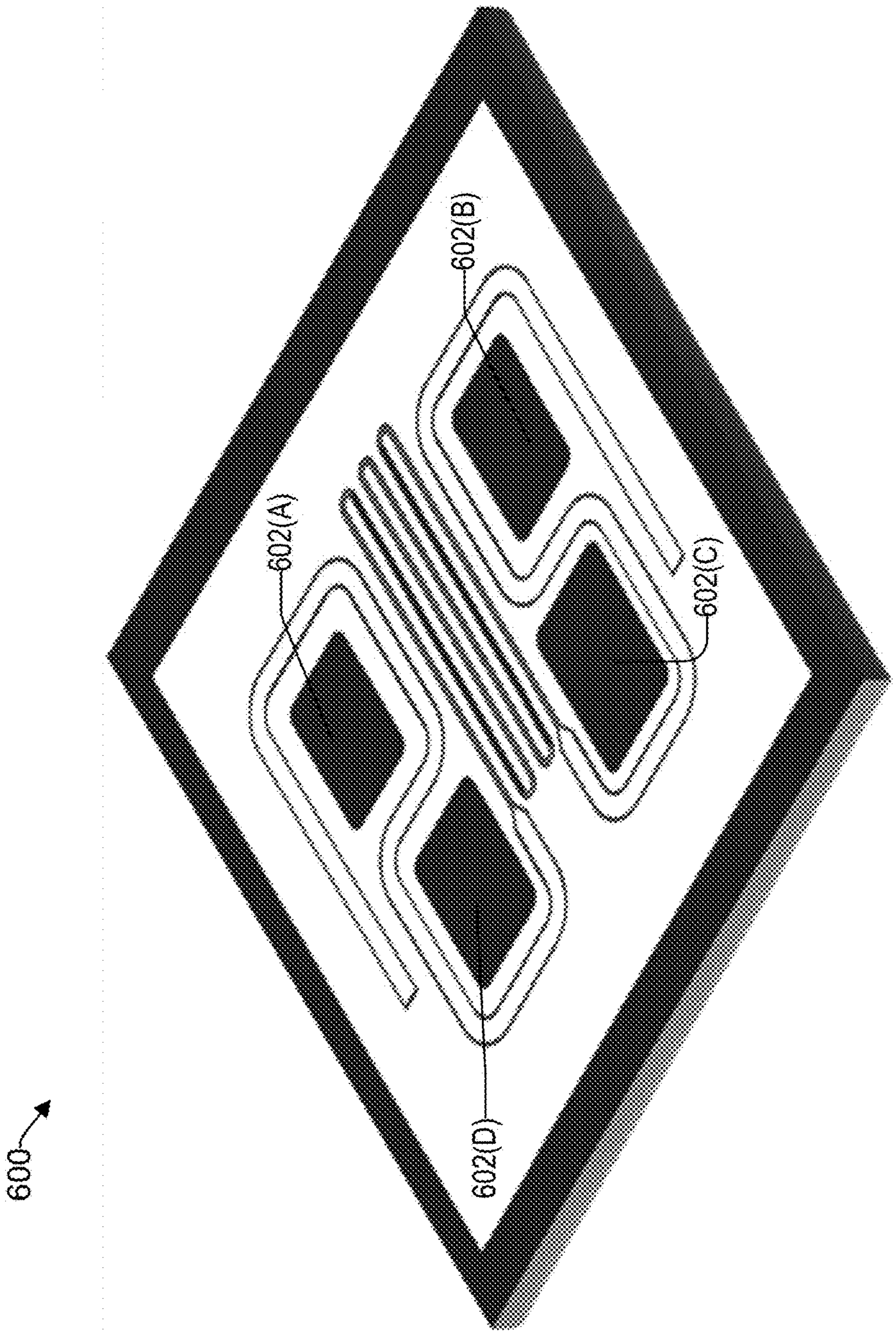
FIG. 6 illustrates an example coplanar waveguide transmission line resonator having end portions that are wrapped around under bump metallization that can be used for flip-chip packages, consistent with an illustrative embodiment.

In some embodiments, the first end portion 502 and/or the second end portion 530 may have an "S" structure. For example, the S structure may be used to wrap around connection points 540(A) to 540(D). For example, each of the connection points 540(A) to 540(D) may accept wire bonds by way of one or more pads, bumps, wire bonds, etc. It should be noted that the resonator 500 can also be used in the context of bump bonding packaging. In this regard, FIG. 6 illustrates an example CPW transmission line resonator having end portions that are wrapped around under bump metallization (UBM) that can be used for flip-chip packages, consistent with an illustrative embodiment. Thus, the large open areas of the end portions of the resonator 600 can accommodate relatively large bump bonds 602(A) to 602(D), respectively. The UBM can be evaporated into areas of the resonator structure 600 and lifted off, as appropriate.

Returning to FIG. 5, in one embodiment, the middle portion 510 has an inductance that is a factor of 2 or more than the inductance of the end portions 502 and 530. Alternatively, or in addition, the middle portion 510 has a capacitance that is a factor of at least 2 less than the inductance of each of the end portions 502 and 530.

Figure 7:
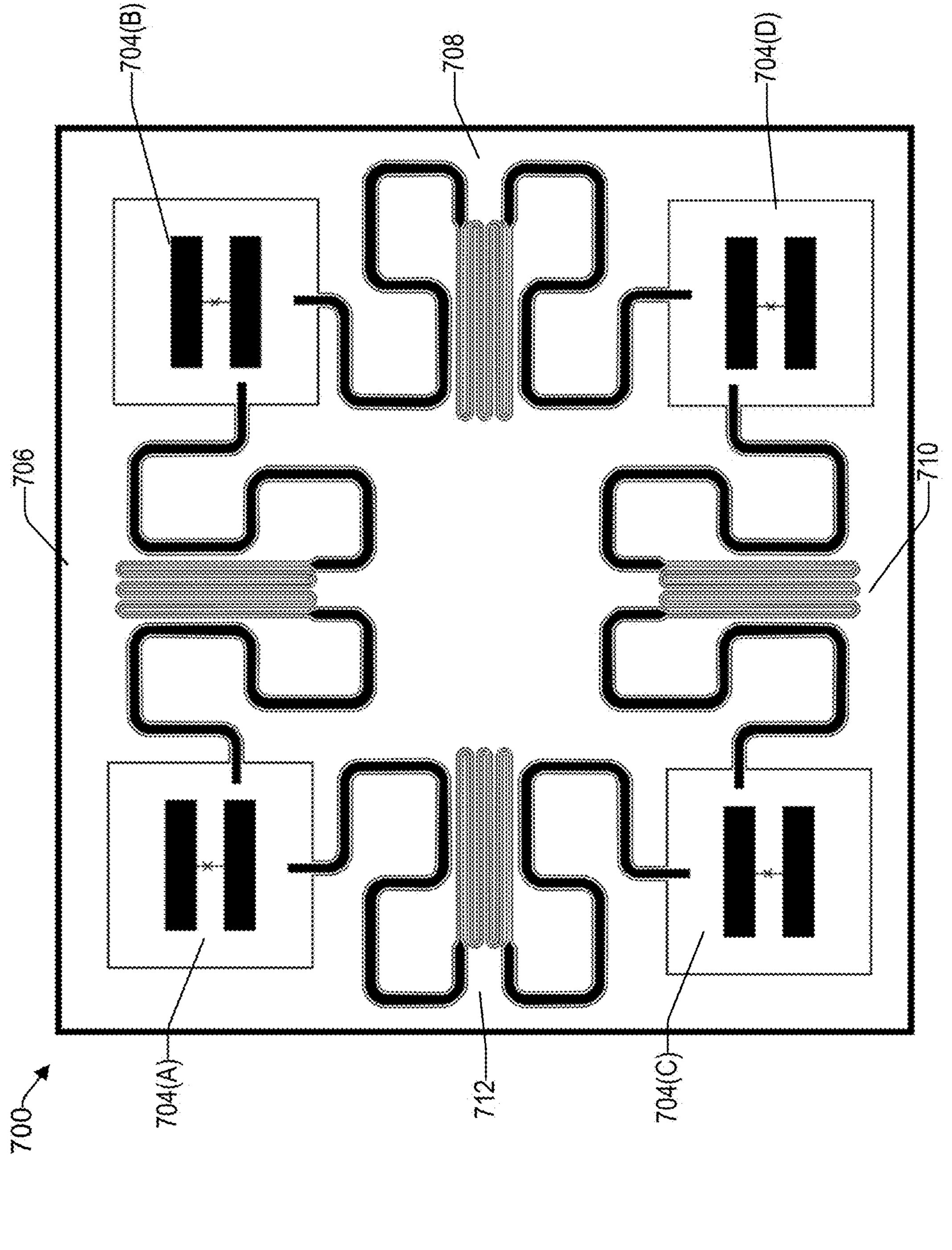
FIG. 7 illustrates an example floorplan of a multi-qubit computing system, consistent with an illustrative embodiment.

FIG. 7 illustrates an example floorplan of a multi-qubit computing system 700, consistent with an illustrative embodiment. Floorplan 700 includes a qubit in each corner, wherein each pair of qubits is coupled together by a corresponding resonator. For example, each qubit (704(A) to 704(D)) may be a transmon qubit, which is a superconducting charge qubit that has reduced sensitivity to charge noise. In some embodiments, two superconductors are capacitively shunted in order to decrease the sensitivity to charge noise. The transmon achieves its reduced sensitivity to charge noise by increasing the ratio of the Josephson energy to the charging energy, which may be accomplished through the use of a large shunting capacitor.

As illustrated in FIG. 7, each pair of qubits is coupled together via a CPW transmission line resonator having the structure discussed herein. For example, qubits 704(A) and 704(B) are coupled together by resonator 706; qubits 704(B) and 704(D) are coupled together by resonator 708; qubits 704(D) and 704(C) are coupled together by resonator 710; and qubits 704(A) and 704(C) are coupled together by resonator 712. In various embodiments, each pair of qubits is coupled to an adjacent resonator capacitively or inductively. By virtue of the using the architecture of FIG. 7, a very area efficient and low interference multi-qubit computing system 700 is provided.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A resonator, comprising:
a coplanar waveguide (CPW) structure comprising;
a first end portion having a first width and configured to be coupled to a first qubit;
a middle portion having a second width that is narrower than the first width; and
a second end portion having a third width that is wider than the second width and configured to be coupled to a second qubit,
wherein an inductance of the middle portion is higher than an inductance of each of the first and second end portions.

2. The resonator of claim 1, wherein at least of the first or second end portions has an S structure.

3. The resonator of claim 2, wherein the S structure is around one or more bonding structures.

4. The resonator of claim 3, wherein at least one of the one or more bonding structures is an under-bump metal (UBM).

5. The resonator of claim 1, wherein the first width is substantially equal to the third width.

6. The resonator of claim 1, wherein the middle portion of the CPW structure is folded.

7. The resonator of claim 1, wherein the coupling between the first qubit and the first end portion is capacitive.

8. The resonator of claim 1, wherein a length of the first end portion and a length of the second end portion are each shorter than a length of the middle portion.

9. The resonator of claim 1, wherein a capacitance of the middle portion is lower than a capacitance of each of the first and second end portions.

10. The resonator of claim 1, wherein a first mode of the resonator is above a factor of 2 times a fundamental frequency of the resonator.

11. A resonator, comprising:
a coplanar waveguide (CPW) structure comprising;
a first end portion having a first width and configured to be coupled to a first qubit;
a middle portion having a second width that is narrower than the first width; and
a second end portion having a third width that is wider than the second width and configured to be coupled to a second qubit
wherein the first and third widths are based on a width that provides a capacitance and inductance of the first and second end portions, respectively, that increases a frequency of modes that are above a fundamental frequency of the CPW structure.

12. A quantum bus system, comprising:
a first qubit;
a second qubit; and
a coplanar waveguide (CPW) structure comprising:
a first end portion having a first width and coupled to the first qubit;
a middle portion having a second width that is narrower than the first width; and
a second end portion having a third width that is wider than the second width and coupled to the second qubit,
wherein an inductance of the middle portion is higher than an inductance of each of the first and second end portions.

13. The system of claim 12, wherein:
the middle portion of the CPW structure is folded; and
at least of the first or second end portions has an S structure.

14. The system of claim 13, wherein the S structure is around one or more bonding structures.

15. The system of claim 12, wherein the coupling between the first qubit and the first end portion is capacitive.

16. The system of claim 12, wherein a length of the first end portion and a length of the second end portion are each shorter than a length of the middle portion.

17. The system of claim 12, wherein:
an inductance of the middle portion is higher than an inductance of each of the first and second end portions; and
a capacitance of the middle portion is lower than a capacitance of each of the first and second end portions.

18. The system of claim 12, wherein a first mode of the resonator is above the factor of 2 times a fundamental frequency of the resonator.

19. A quantum bus system, comprising:
a first qubit;
a second qubit; and
a coplanar waveguide (CPW) structure comprising:
a first end portion having a first width and coupled to the first qubit;
a middle portion having a second width that is narrower than the first width; and
a second end portion having a third width that is wider than the second width and coupled to the second qubit,
wherein the first and third widths are based on a width that provides a capacitance and inductance of the first and second end portions, respectively, that increases a frequency of modes that are above a fundamental frequency of the CPW structure.

20. A method of coupling qubits, comprising:
coupling a first end portion of a coplanar waveguide (CPW) structure to a first qubit;
coupling a second end portion of the CPW structure to a second qubit; and
providing a middle portion of the CPW structure to have a width that is less than a width of the first end portion and a width of the second end portion, and
increasing a frequency of modes that are above a fundamental frequency of the CPW structure by adjusting a geometry of the first and second end portions of the CPW structure.

21. The method of claim 20, wherein the coupling between the first qubit and the first end portion is capacitive.

22. The method of claim 20, further comprising providing a first mode of the CPW structure to be a factor of at least 2 times a fundamental frequency of the resonator.

* * * * *